Jan. 5, 1971     M. S. BAWA     3,553,279
METHOD OF PRODUCING ETHYLENE
Filed March 29, 1968
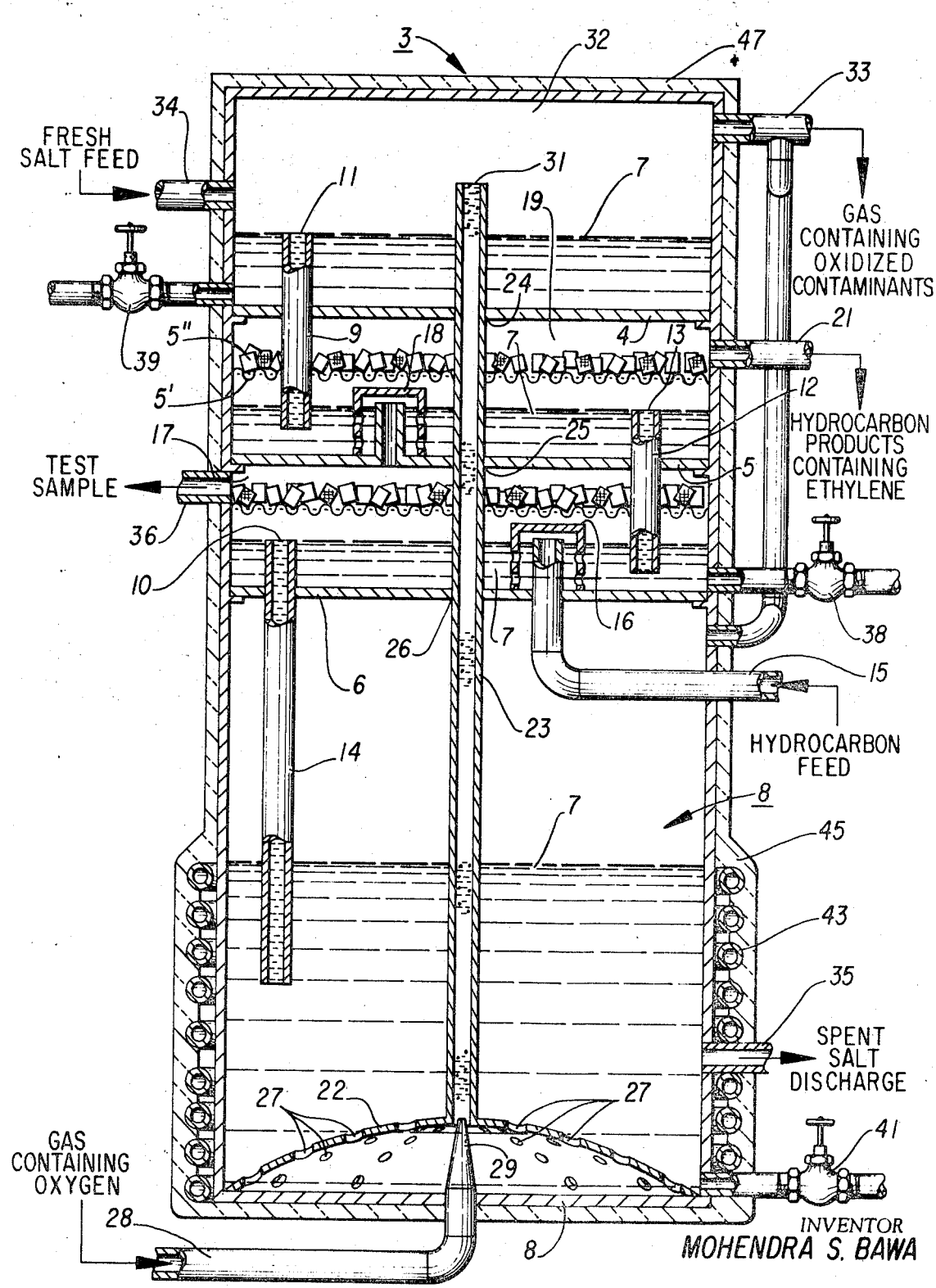
INVENTOR
MOHENDRA S. BAWA United States Patent Office 3,553,279
Patented Jan. 5, 1971

3,553,279
METHOD OF PRODUCING ETHYLENE
Mohendra S. Bawa, Dallas, Tex., assignor to Texas Instruments Incorporated, Dallas, Tex., a corporation of Delaware
Filed Mar. 29, 1968, Ser. No. 717,132
Int. Cl. C07c 3/30
U.S. Cl. 260—683
11 Claims

ABSTRACT OF THE DISCLOSURE

This specification discloses a method of producing an olefin, such as ethylene, characterized by physically contacting a hydrocarbon feed stream with a molten salt of either alkali metal carbonate, alkali metal hydroxide, or a mixture thereof for a sufficient time to allow reaction to form hydrocarbon products, containing ethylene as one of the major ingredients; separating the hydrocarbon products from the molten salt; and separating the ethylene from the hydrocarbon products. The salt is maintained at a temperature within the range of 350° C.–850° C. preferably 550° C.–700° C. In a specific embodiment, the molten salt is intimately contacted by an oxygen-containing gas to convert contaminants in the molten salt to gases which are withdrawn to regenerate the molten salt. The regenerated molten salt is recycled into contact with the hydrocarbon feed stream. The molten salt alleviates polymerization and isomerization problems; ties up contaminants in the hydrocarbon feed, preventing corrosion within the reactor and simplifying separation of the ethylene from the hydrocarbon products; effects reaction of the hydrocarbons at lower temperatures, allowing less expensive materials to be employed for the reaction vessels; and effects high yields of ethylene from higher molecular weight hydrocarbons.

BACKGROUND OF THE INVENTION

(1) Field of the invention

This invention relates to a process for producing an olefin, such as ethylene, from hydrocarbons at medium high temperature by means of a specific molten salt heat transfer medium.

(2) Description of the prior art

Ethylene has been manufactured by a variety of processes including cracking of hydrocarbons. Processes known as thermal processes employed elevated temperatures of 1200–1500° F. but required specific hydrocarbon feed stocks for feasible yields and produced excessive coking of the tubular reactors.

Ethylene has been manufactured by cracking hydrocarbons in the presence of a molten heat transfer medium; such as lead, and recently salt at high temperatures of 750–1000° C.

The molten mediums employed in the past in processes of this kind have suffered from one or more objections. For example, the molten mediums required separate treating operations to purify the molten mediums of carbon in a finely divided state. Other processes employed molten salts operating at high temperatures, effecting carbonization to an undesirable degree necessitating extremely short reaction times to prevent polymerization of products, and requiring expensive materials of construction to contain the molten salt at these high temperatures. Moreover, the salts employed as the molten salts in the prior art processes have not been able to tie up contaminants in the hydrocarbon feed stream to the desired degree. Of particular importance is the fact that the molten salts in the prior art processes did not alleviate difficulties associated with polymerization and isomerization reactions of the hydrocarbon product.

Employing catalysts and low temperatures was found objectionable because of expensive catalyst replacement problems.

SUMMARY OF THE INVENTION

It is an object of this invention to effect reaction of a given hydrocarbon feed employing a molten salt which will achieve high yields of ethylene therefrom; tie up contaminants in the hydrocarbon feed; require lower temperatures; suppress the formation of free carbon and the polymerization and isomerization reactions; permit reasonable reaction times, and allow the employment of relatively economical materials of construction in manufacturing the reactors for carrying out the reaction.

It is also a specific object of the invention to provide a continuous process for carrying out the cracking of the hydrocarbons to product the high yields of ethylene employing the molten salt with its attendant advantages, and simultaneously and concurrently regenerating the molten salt in a single vessel.

It is also a specific object of one embodiment to provide a weakly basic $OH^-$ in addition to the alkaline molten salt to effect an environment for reaction of a hydrocarbon feed in which carbon deposition, polymerization reactions, and isomerization reactions are lessened even further than in the broad practice of the invention.

In accordance with the invention, ethylene is produced by:

(a) Physically contacting a hydrocarbon feed stream with a molten salt of either an alkali metal carbonate, an alkali metal hydroxide, or a mixture thereof for a period of time sufficient to allow a reaction to proceed and form hydrocarbon products containing ethylene as one of the major constituents;

(b) Separating the cracked hydrocarbon products from the molten salt; and (c) Separating the ethylene from the hydrocarbon products.

In carrying out one aspect of the invention, a molten salt is fed into a reaction vessel at the upper portion thereof, a hydrocarbon feed stream is fed into a reaction vessel at the lower portion thereof and passed counter-currently with the molten salt and in intimate contact therewith, through the reaction vessel to produce the hydrocarbon products; the hydrocarbon products are withdrawn from the upper portion of the reaction vessel; the molten salt, with contaminants that it has extracted from the hydrocarbon feed stream, are passed into the bottom of the reaction vessel; an oxygen-containing gas is passed into a vertical standpipe, entraining the molten salt and lifting it up the vertical standpipe while oxidizing the contaminants therein, and depositing the regenerated molten salt in a chamber at the top of the reaction vessel to effect an internal recycle of regenerated molten salt; gaseous, oxidized contaminants are withdrawn from the top chamber in the vessel; a portion of spent salt is withdrawn from the bottom of the reaction vessel; and fresh salt is fed into the upper portion of the reaction vessel.

BRIEF DESCRIPTION OF THE DRAWING

The figure is a pictorial view in vertical section of apparatus enabling carrying out a specific aspect of the present invention.

DESCRIPTION OF SPECIFIC EMBODIMENT(S)

In carrying out the invention, several embodiments may be employed. For example, the hydrocarbon feed stream may be bubbled through a reactor containing the molten salt. The reactor is suitably heated to retain the salt in a molten state. The hydrocarbons in the hydrocarbon feed stream are vaporized and react; such as divide, or "crack"; to yield the gaseous products including, as one of the major constituents, ethylene. The bubbling of the hydrocarbons is continued until an effluent analysis indicates the presence of contaminants in the products or otherwise indicates it is desirable to change the molten salt.

Such batch processes are relatively inefficent and can be improved by continuous processes. In a continuous process the hydrocarbon feed and the molten salt may be intimately admixed and passed through a reaction chamber before separation of the cracked hydrocarbon products, including the ethylene, is effected. The admixing and passing through the reaction zone may be concurrently. Because of a difference in densities, a countercurrent flow is particularly advantageous. The molten salt may be introduced into the upper portion of the reaction vessel and passed downward therethrough. The hydrocarbon feed is introduced into a lower portion of the reaction vessel and passes upward through the molten salt. Intimate contact may be effected by conventionally packed towers; e.g., towers packed with Raschig rings or Beryl saddles. In such process, however, there may be breakage of the packing during shutdown and start-up procedures because of the slight expansion of the molten salt and the difficulty of draining of all the molten salt from the packing.

A preferred embodiment is explained in detail in connection with the figure. In the figure a vertical reactor 3, which may be cylindrical in transverse cross-section is provided with a plurality of trays 4–6. Trays 4–6 support a molten inorganic salt 7 as does bottom 8 of reactor 3. Molten salt 7 on tray 4 overflows through downspout 9 and mixes with molten salt 7 on tray 5. Protruding standpipe 11 maintains a constant liquid level of molten salt above tray 4. The molten salt flows across tray 5 and in turn overflows through downspout 12, with its standpipe 13 protruding above tray 5 to maintain a constant level of molten salt thereon. The molten salt flows across tray 6 and downward into the bottom 8 of reactor 3 through downspout 14, with its standpipe 10 maintaining a constant level of molten salt above tray 6. A hydrocarbon feed stream is fed through conduit 15 into the molten salt 7 on tray 6 through a conventional bubble cap 16 which disperses the hydrocarbons in the hydrocarbon feed stream in molten salt 7 and permits intimate contact therebetween. The molten salt is maintained between 350° C. and 850° C. Preferably, the molten salt is maintained between 550° C. and 700° C.

The gaseous effluent of cracked hydrocarbon products and any unreacted hydrocarbon from tray 6 will flow through vapor space 17 above tray 6 and pass through conventional bubble cap 18 on tray 5. Bubble cap 18 disperses the gaseous effluent in the molten salt 7 on tray 5 to effect intimate contact between the gases and the molten salt and effect further cracking of the hydrocarbon constituents. The gaseous effluent from the molten salt on tray 5 are withdrawn through vapor space 19 above tray 5 via conduit 21.

For simplicity, the operation of this embodiment of the invention has been described with respect to a single bubble cap and only two trays. Greater or lesser residence time and hence reaction time may be effected by employing more or lesser trays. Similarly, a greater number of bubble caps may be employed on a given tray for greater capacity. Entrainment of the molten salt at high rates of flow may be prevented by permeable material such as stainless steel mesh 5″ held in place by screen 5′.

Once the cracked hydrocarbons have been withdrawn from the reactor, the ethylene can be separated from the remainder of the gaseous hydrocarbon products by any of the several methods conventionally employed. For example, in the Encyclopedia of Chemical Technology, Kirk and Othmer, New York Interscience Encyclopedia, Inc., 1952, page 880, et seq., specifically 891–894, there are delineated several methods of effecting separation of ethylene from the cracked hydrocarbons. These methods include distillation, or fractionation; scrubbing, i.e., absorption and distillation; and hypersorption. As noted therein, the hydrocarbon products are quenched, or cooled; promptly after withdrawal from the reactor for best results in producing ethylene. In particular, selective adsorption employing molecular size and relative polarity discrimination of the molecule offers new possibilities in economical separation of ethylene from the cracked hydrocarbons. The molecular sieve adsorbents such as sodium-, calcium-, potassium- or lithium-substituted aluminosilicates are good adsorbents. The adsorption is followed by desorption of the adsorbate, now rich in ethylene. Adsorption and desorption cycles may be either long or short. The cycles, which may run from as short as twenty minutes to as long as 48 hours, and the tests to determine their length are well known and need not be described in greater detail herein.

Particular features of the invention and of this specific embodiment thereof warrant further explanation to facilitate understanding the internal regeneration of the molten salt.

Various hydrocarbons may be employed as the hydrocarbon feed stream. Ordinarily, the hydrocarbon feed stream will be an economical, straight run cut of hydrocarbon. The lower-boiling hydrocarbon such as ethane, propane or butane may be employed. Straight chain alkyl hydrocarbons and olefins may be employed. Other hydrocarbons such as kerosene; jet fuel, such as JP–4; fuel, such as CITE; gasolines; diesel fuel; light fuel oils; and even crude oils may be employed. It is desirable to employ crude oils only when their sulfur content and their asphaltene content is not excessively high.

For practical purposes, the molten salt will be an alkali metal carbonate, an alkali metal hydroxide, or a mixture of two or more of these salts. These salts are basic in character and thus suppress acid-catalyzed reactions, such as polymerization reactions and isomerization reactions. Furthermore, the molten salts are effective in removing contaminants such as sulfur and sulfur compounds from the hydrocarbon feed stream. Best results are obtained with the alkali metal carbonates. By alkali metal is meant the Group 1A cations; such as lithium, sodium, potassium, rubidium, and cesium. The molten salt will have a melting point within the range of 350° C.–850° C. and be stable in the molten state at temperatures of 350° C.–850° C. As indicated hereinbefore, the preferred molten salt will have a melting point within the range of 550° C.–700° C. and be stable in the molten state at temperatures of 550° C.–700° C. Mixtures of the above-named salts may be employed to form a molten salt having a melting point in a desired range of temperature. In particular, mixtures of the salts may be employed to form a preferred molten salt. For example, a salt containing about equal parts of sodium carbonate in lithium carbonate forms a particularly effective preferred molten salt.

The molten salts which we have employed serve as a heat transfer agent and also apparently aid in cracking aromatic and branched chain hydrocarbons in the feed stream. Furthermore, the molten salt serves to remove sulfur and other contaminants from the hydrocarbon feed stream. For example, the sulfur impurity, which may be represented generally by the formula ·S· is believed to undergo reactions with a carbonate salt in accordance with Equation 1:

$$\cdot S \cdot + CO_3^= \rightarrow SO_3^= + CO_2 \qquad (1)$$

In this way corrosive and troublesome contaminant-containing compounds are eliminated from the cracked hydrocarbon products from which the ethylene is to be separated. Thus, fouling of an adsorbent is prevented; or, conversely, the difficulties encountered in separating the contaminants-containing compounds from the other constituents in the cracked hydrocarbon stream containing ethylene are avoided. The sulfite thus produced will undergo further reaction, as will be explained later. The alkali metal hydroxides similarly are effective in removing sulfur and sulfur compounds from the hydrocarbon feed.

The following description explains the internal regeneration of the molten salt in this embodiment of the invention. The molten salt 7 on trays 5 and 6 will contain any carbon that may be formed during the cracking of the hydrocarbons, as well as any sulfur and other contaminants in the hydrocarbon feed, and will flow through downspouts 12 and 14 into bottom 8 of reactor 3. Bottom 8 of reactor 3 is provided with a foraminous truncated spherical-shaped shell 22 having an integral vertical conduit 23 which rises through trays 4–6. Vertical conduit 23 is sealingly affixed to trays 4–6 at points 24–26, respectively. The carbon and sulfur laden salt 7 contained in the bottom 20 of container 3 will enter shell 22 through apertures 27. An oxygen-containing gas, such as air, is introduced through conduit 28 into the bottom 8 of reactor 3 near the bottom end of vertical conduit 23. The oxygen-containing gas lifts the molten salt through vertical conduit 23, simultaneously intimately mixing therewith and oxidizing the contaminants such as the carbon and sulfur. For example, the oxygen in the oxygen-containing gas oxidizes the carbon very readily in the molten salt in accordance with Equation 2.

$$C + O_2 + 4N_2 \rightarrow CO_2 + 4N_2 \qquad (2)$$

Similarly, the sulfur is readily oxidized in the molten salt in accordance with the Equation 3.

$$S + O_2 + 4N_2 \rightarrow SO_2 + 4N_2 \qquad (3)$$

Ordinarily, a slight stoichiometric deficiency of oxygen is introduced to prevent the danger of unwanted combustion within the reactor. Under such conditions, carbon monoxide may be formed instead of carbon dioxide, and similarly sulfur dioxide may remain as gas. On the other hand, if a surplus of oxygen is employed the sulfur dioxide may be reacted to form sulfur trioxide. Likewise, the sulfite retained by molten salt 7 is believed to undergo a reaction with surplus oxygen in accordance with Equation 4.

$$SO_3^= + O_2 + 4N_2 \rightarrow SO_4^= + 4N_2 \qquad (4)$$

The gaseous by-products of the oxidation between the contaminants and the oxygen in the oxygen-containing gas will exit at the top 31 of vertical conduit 23 into vapor space 32 above tray 4. The gaseous by-products are withdrawn through conduit 33. Molten salt 7 exiting top 31 of vertical conduit 23 onto tray 4 will flow through across tray 4, over standpipe 11, and down downspout 9 onto tray 5 and provide an internal re-cycle of molten salt which has been regenerated by oxidation of the contaminants therefrom.

Since the sulfur contained in salt 7 may gradually build up a concentration of sulfates in the molten salt, fresh molten salt may be fed, intermittently or continuously, through conduit 34 onto tray 4. To prevent flooding of the trays by an accumulation of salt within reactor 3, unregenerated, or spent, salt is withdrawn through conduit 35. The amount of salt fed to reactor 3 will depend upon the degree of sulfur contaminant in the hydrocarbon feed.

The degree of contamination may be monitored by monitoring the gaseous contaminants in the cracked hydrocarbons withdrawn through conduit 21. Preferably, however, a test conduit 36 is provided for periodically withdrawing test samples to monitor the build up of contaminants. Such sampling may also be employed for the purposes of optimizing the temperature and the cracking of the hydrocarbons.

The reactor 3 is ordinarily operated continuously. In the event it becomes necessary to shutdown the operation, the molten salt may be drained from the respective trays through conduits and drain valves, shown as valves 38 and 39 arranged around the exterior of the reactor (not visible from tray 5). Similarly, valve 41 may be provided to drain the bottom of the reactor 3. Alternatively, the supply of hydrocarbon feed may be discontinued, as it would be in any event, and the regenerating of the molten salt by the introduction of oxygen-containing gas continued until a complete cycle of regenerated salt is effected. At this time the introduction of the oxygen-containing gas is discontinued and the molten salt allowed to solidify in situ. To effect start-up thereafter, heating coils are provided. Such heating coils are illustrated as coils 43 in insulation 45 around the bottom of the vessel. Similarly, heating coils may be provided on each of the respective trays. It is preferred that the heating coils are not employed when hydrocarbons are within the reactor; or, if so, that the heating coils be immersed in the molten salt to prevent deposition of carbon thereon.

The heating coils may be employed, along with suitable insulation 47 to maintain the desired temperature. Other ways of heating reactor 3 may be employed. For example, with proper precautions an open burner may be employed to provide hot exhaust gases past the exterior of the reactor.

The reactor and internal components such as the bubble caps and trays may be stainless steel number 446 or Inconel 702 since only medium high temperatures are employed. These numbers and names are trademarks for high temperature alloys.

Although catalysts may be employed in conjunction with the molten salt in the process of the invention, it will be appreciated that the hydrocarbon feed stream must be chosen more carefully when a catalyst is employed, since the catalyst may be poisoned or fouled.

When hydrocarbon feed streams containing lead are employed, the molten salts will remove the lead although the exact mechanism is not completely understood.

The embodiments hereinbefore have described introduction of hydrocarbon feed into the reactor. The deposition of carbon, which is not severe, is lessened still further by the introduction of water, preferably in the form of steam. The weakly basic character of hydroxyl ions $OH^-$ in the carbonate melt suppresses polymerization and isomerization reactions which require acid catalysis. For example, water in an amount of up to about ten percent of the weight of the hydrocarbon feed may be introduced with the hydrocarbon feed. Also, water may be introduced with the oxygen-containing gas. For example, enough water to saturate the oxygen-containing gas at the temperature of the molten salt is advantageous in regenerating the molten salt.

The following examples illustrate the invention:

EXAMPLE I

A straight run hydrocarbon having a boiling range from 170° C.–300° C. was introduced into molten lithium-sodium carbonate having a melting point of 500° C. and maintained at 650° C. Of the hydrocarbon feed stream introduced, 50% by weight was converted on a single pass into gaseous cracked hydrocarbon products. Of the gaseous product formed, 35.3% by volume, or 59.1% by weight, was ethylene. For purposes of comparison Table I summarizes results effected in this example.

TABLE I

Feed Boiling Range, 170–300° C.
Temperature of Salt, ° C., 650
Degree of Conversion, weight percent, 50

| | Vol. percent | Weight percent |
|---|---|---|
| Composition of gaseous product: | | |
| $H_2$ | 14.6 | 0.7 |
| $CH_4$ | 25.2 | 24.1 |
| $C_2H_4$ | 35.3 | 59.1 |
| $C_2H_6$ | 5.0 | 9.0 |
| $C_3H_6$ | | |
| $C_4H_8$ | | |
| $CO_2$ | 2.5 | 6.6 |
| $CO$ | 0.3 | 0.5 |

EXAMPLE II

In this example normal butane was introduced into the molten salt employed in Example I, maintained at 650° C. On a single pass 39.1% by weight of the normal butane was converted into gaseous cracked hydrocarbon products. Of the gaseous products formed 20.1% by volume, or 27.1% by weight, was ethylene. Table II summarizes the results effected in this example.

TABLE II

Feed, n-butane
Temperature of Salt, ° C., 650
Degree of Conversion, weight percent, 39.1

| Composition of converted gaseous product: | Vol. percent | Weight percent |
|---|---|---|
| $H_2$ | 29.6 | 2.8 |
| $CH_4$ | 24.0 | 18.4 |
| $C_2H_2$ | | |
| $C_2H_4$ | 20.1 | 27.1 |
| $C_2H_6$ | 3.6 | 5.1 |
| $C_3H_6$ | 14.3 | 27.9 |
| $C_4H_8$ | | |
| $CO_2$ | 7.5 | 16.4 |
| $CO$ | 0.9 | 2.3 |

EXAMPLE III

In this example propane was introduced into a lithium-sodium carbonate eutectic having a melting point of 500° C. and maintained at 550° C. On a single pass 34.2% by weight of the propane was converted to gaseous cracked hydrocarbon product. Of the gaseous product formed, 25.0% by volume, or 29.3% by weight, was ethylene. Table III summarizes the result effected in this example.

TABLE III

Feed, propane
Temperature of Salt, ° C., 550
Degree of Conversion, weight percent, 34.2

| Composition of converted gaseous product: | Vol. percent | Weight percent |
|---|---|---|
| $H_2$ | 25.2 | 2.3 |
| $CH_4$ | 23.5 | 17.4 |
| $C_2H_4$ | 25.0 | 29.3 |
| $C_2H_6$ | | |
| $C_3H_6$ | 20.6 | 40.4 |
| $CO_2$ | 5.1 | 9.7 |
| $CO$ | 0.6 | 0.9 |

The foregoing examples show that because of the alkaline property of the molten salt, the ethylene can be produced at most nearly optimum theoretical temperatures, in the range of 550° C.–700° C. with propane, without the usual problems of depositing carbon, of polymerization reactions, and of isomerization reactions. Moreover, Examples 2 and 3 show that propylene $C_3H_6$ is produced in quantities such that its separation is economically feasible, in addition to sepaarting the ethylene.

In summary it can be seen that employing the molten salt of the invention enables carrying out the production of ethylene with the following advantages:

(1) The salts are inexpensive and light weight, (2) The salts have superior heat transfer characteristics with respect to the hydrocarbon feed, (3) The reaction of the hydrocarbon feed may be carried out at a lower temperature than the prior art processes employing a different molten salt, (4) The molten salt removes contaminants such as sulfur from the hydrocarbon feed, and prevents deposition of carbon and the build-up ordinarily accompanying the deposited carbon, (5) The molten salts are easily regenerable and allow use of an internal regeneration cycle, and (6) The molten salt provides a short of reverse catalysis with respect to the polymerization and isomerization reactions which, along with carbon deposition, were so troublesome in the early thermal processes; thus enabling very nearly theoretical results to be obtained.

Having thus described the invention, it will be understood that such description has been given by way of illustration and example and not by way of limitation. The appended claims define the scope of the invention.

What is claimed is:

1. A method of cracking a hydrocarbon feed to produce cracked hydrocarbon products containing ethylene as a major constituent which comprises the steps of:

(a) passing into the upper portion of a reactor, a molten salt of either an alkali metal carbonate, an alkali metal hydroxide, or a mixture thereof and collecting said molten salt at the bottom of said reactor;

(b) passing into the lower portion of said reactor and passing countercurrently to said molten salt within said reactor, a hydrocarbon feed;

(c) effecting intimate contact between said molten salt and said hydrocarbon feed as they flow countercurrently to each other through a reaction zone, whereby gaseous cracked hydrocarbon products are formed;

(d) withdrawing said gaseous cracked hydrocarbon products from said reactor;

(e) quenching said gaseous cracked hydrocarbon products;

(f) separating said ethylene from the remainder of said cracked hydrocarbon products;

(g) passing an oxygen containing gas into said reactor and up a vertical stand pipe having openings communicating with said molten salt in the bottom of said reactor to entrain and carry up said vertical stand pipe said molten salt, effecting intimate mixing of said oxygen containing gas with said molten salt and regenerating said molten salt by oxidizing oxidizable contaminants contained therein, and effecting internal recycle of said molten salt in said reactor;

(h) withdrawing only a portion of said molten salt that has not been regenerated from the bottom of said reactor; and (i) supplying a makeup stream of said molten salt of substantially the same volume as that portion withdrawn from the bottom of said reactor, whereby the desired quantity and quality of said molten salt is maintained within said reactor.

2. The method of claim 1 wherein said oxygen-containing gas is air.

3. The method of claim 1 wherein the oxidized contaminants are converted to gaseous form and withdrawn from a chamber at the upper end of said vertical standpipe, and said regenerated molten salt is introduced onto trays in said reactor through a downspout from said chamber.

4. The method of claim 1 wherein said oxygen-containing gas is oxygen.

5. The method of claim 1 wherein said molten salt is maintained at a temperature within the range of 350° C.–850° C.

6. The method of claim 1 wherein said molten salt is maintained at a temperature within the range of 550° C.–700° C.

7. The method of claim 1 wherein water in an amount of up to ten percent by weight by said hydrocarbon feed is introduced with said hydrocarbon feed into the lower portion of said reactor.

8. The method of claim 1 wherein water is introduced into said oxygen-containing gas in an amount sufficient to saturate said oxygen-containing gas at the temperature within said reactor.

9

9. The method of claim 1 wherein said molten salt contains an alkali metal sulfate.

10. The method of claim 1 wherein supplemental heat, in addition to heat liberated by oxidizing contaminants in said molten salt is introduced into said reactor to maintain said molten salt at the temperature desired within said reactor.

11. The method of claim 1, wherein propylene is also separated from said hydrocarbon products and from said ethylene.

10

References Cited

UNITED STATES PATENTS 2,160,239 5/1939 Voorhees ---------- 208—125
3,081,256 3/1963 Hendal et al. -------- 208—125

DELBERT E. GANTZ, Primary Examiner

C. E. SPRESSER, JR., Assistant Examiner

U.S. Cl. X.R.

208—125